United States Patent [19]
Kano et al.

[11] Patent Number: 6,069,778
[45] Date of Patent: May 30, 2000

[54] METHOD OF PRINTING ON A CASING FOR FORMING MULTIPLE PRINTED LAYERS TO PROVIDE A PROTECTED DECORATIVE AREA AND UNPROTECTED AREA ON WHICH WRITING CAN BE FORMED

[75] Inventors: Kenichi Kano; Kokichi Sugawara, both of Miyagi, Japan

[73] Assignee: Sony Corporation, Japan

[21] Appl. No.: 09/136,520

[22] Filed: Aug. 19, 1998

Related U.S. Application Data

[62] Division of application No. 08/200,707, Feb. 23, 1994, Pat. No. 5,799,008.

[30] Foreign Application Priority Data

Feb. 26, 1993 [JP] Japan ................................. P05-094826

[51] Int. Cl.[7] ................................................. G11B 23/02
[52] U.S. Cl. ........................ 360/132; 369/291; 428/195
[58] Field of Search ................................. 360/132, 133; 369/273–274, 286, 291–292; 347/4, 3, 8, 43, 105; 358/296, 502

[56] References Cited

U.S. PATENT DOCUMENTS

| | | | |
|---|---|---|---|
| 4,996,681 | 2/1991 | Cocco et al. | 369/274 |
| 5,018,640 | 5/1991 | Morofuji et al. | 220/456 |
| 5,436,059 | 7/1995 | Kano | 428/195 |
| 5,784,171 | 7/1998 | Kano | 358/296 |
| 5,799,008 | 8/1998 | Kano et al. | 360/132 |
| 5,815,282 | 9/1998 | Kano | 358/296 |

*Primary Examiner*—Brian E. Miller
*Attorney, Agent, or Firm*—Rader, Fishman & Grauer; Ronald P. Kananen

[57] ABSTRACT

A method of printing on a container casing for containing recording media, such as tape-shaped or disc-shaped recording media, includes the step of forming an underlying layer by printing on the outer surface of the main casing member, forming a colored layer on the underlying layer by color printing based on the picture information, and forming a protective layer on the colored layer for protecting the colored layer. The protective layer has an opening for exposing its partial portion to the outside.

2 Claims, 16 Drawing Sheets

METHOD OF PRINTING ON A CASING FOR FORMING MULTIPLE PRINTED LAYERS TO PROVIDE A PROTECTED DECORATIVE AREA AND UNPROTECTED AREA ON WHICH WRITING CAN BE FORMED

This application is a divisional of application Ser. No. 08/200,707 filed Feb. 23, 1994, now U.S. Pat. No. 5,799,008.

BACKGROUND

1. Field of the Invention

The present invention relates to a casing for housing a recording medium and a printing method for forming printing on the casing. More particularly, the present invention relates to a casing for housing the recording medium bearing a printing on its outer surface and a method for making a printing on the outer surface of the casing.

2. Background of the Invention

A casing for housing a recording medium, such as a disc cartridge containing an optical disc or a magneto-optical disc, or a tape cassette containing such as a magnetic tape, usually is provided with printing is made of a so-called logo-mark for indicating that the product is made by a particular company, or various designs for enhancing the commercial value of the product. Such printing on the casing for the recording medium is usually performed in the following manner.

First, a manuscript having the design drawn thereon for printing on the casing is color-separated by a color CCD scanner. Positive color films associated with the separated colors and then the master plates for the respective colors are prepared. After calibration, test printing is made on a cassette and adjustment is made of the ink viscosity. Then, after registration of the color master plates, printing is formed on the casing.

Meanwhile, the picture pattern printed on the outer surface of the casing for the recording medium is supplied from the manufacturer, while there is no room for an ultimate or end user or an intermediate user to make his or her original design.

Thus, the casing cannot be adapted to cope with the demand raised by the ultimate user or the intermediate user for printing desired pictures or designs for presentation or publicity, so that the application of the casing cannot be enlarged as desired. Besides, the paper index or paper label as used heretofore is not satisfactory for presentation or publicity in view of permanent storage and product quality. On the other hand until now, there has been a lack of a container casing for a recording medium in which a picture pattern such as a logo-mark (ornamental design letter), or a variety of designs intended for raising the commercial value of the product, or showing features of the recording contents recorded on the recording medium, and an index for adding the title, logo or characters for event holding by the intermediate user, have been combined into one printing pattern.

SUMMARY OF THE INVENTION

It is, therefore, an object of the present invention to provide a container casing for a recording medium which resolves the above-mentioned problem.

It is another object of the present invention to provide a printing method for a container casing for a recording medium which resolves the above-mentioned problem.

According to the present invention, there is provided a container casing for recording media having a main casing member having the recording media housed therein, including a colored layer formed on the outer surface of the main casing member, and a protective layer formed on the colored layer for protecting the colored layer. The protective layer has an opening for exposing a part of the colored layer.

According to the present invention, there is also provided a method for printing a container casing for recording media having a main casing member having the recording media housed therein, comprising the steps of forming a colored layer on the outer surface of the main casing member, and selectively forming a protective layer on the surface of the colored layer excluding a portion thereof.

It will be noted that, by forming the colored layer on the outer surface of the casing main member having the recording medium housed therein, it becomes possible to annex the mark for asserting that the product is manufactured by a particular company, a design appended for enhancing the commercial value of the product, the pattern featuring the contents of the recording medium or the pattern having an index for the ultimate user. Besides, since an opening is provided in the protective layer protecting the colored layer for partially exposing the colored layer, letters or symbols may be entered by a suitable writing instrument on the exposed portion of the colored layer functioning as the index.

In addition, the protective layer protecting the colored layer provided on the outer surface of the casing main member having the recording medium housed therein is formed on the entire surface of the colored layer excluding its partial region. Since an opening is formed in this manner in the portion of the protective layer in register with the index of the colored layer, letters, symbols or the like may be entered via the opening using a writing instrument.

DESCRIPTION OF THE INVENTION

Referring to FIGS. 1A, 1B, 2 and 3, preferred embodiments of the casing for the recording medium according to the present invention, in the form of a tape cassette rotatably housing a video tape or an audio tape and a disc cartridge rotatably housing a magnetic disk, an optical disc or a magneto-optical disc, will be explained in detail.

Figure 1A:
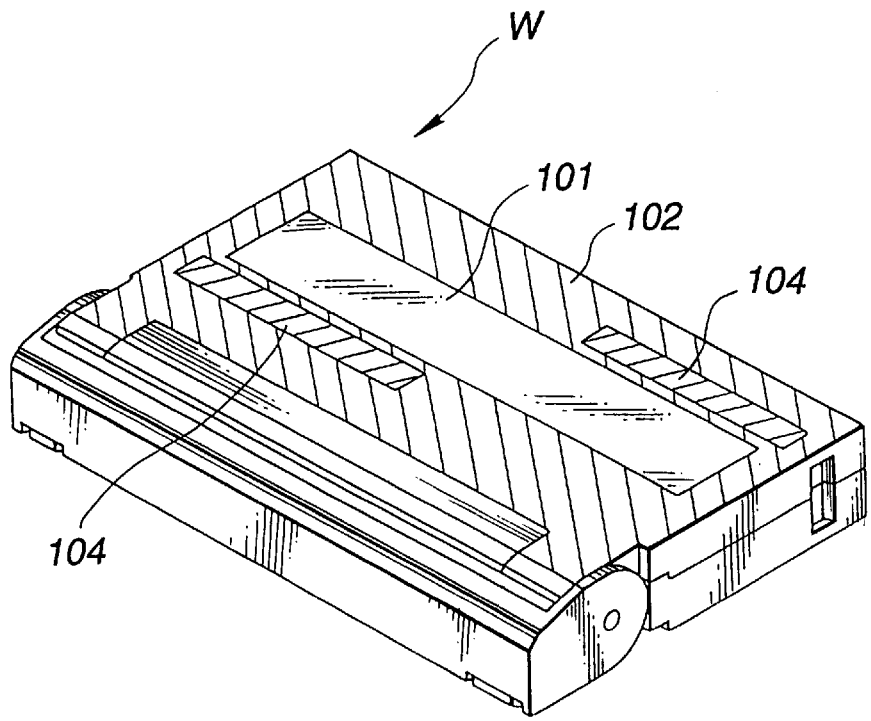
FIGS. 1A and 1B are perspective views showing an embodiment of the casing for the recording medium as applied to a tape cassette for housing a video tape or an audio tape.
Figure 1B:
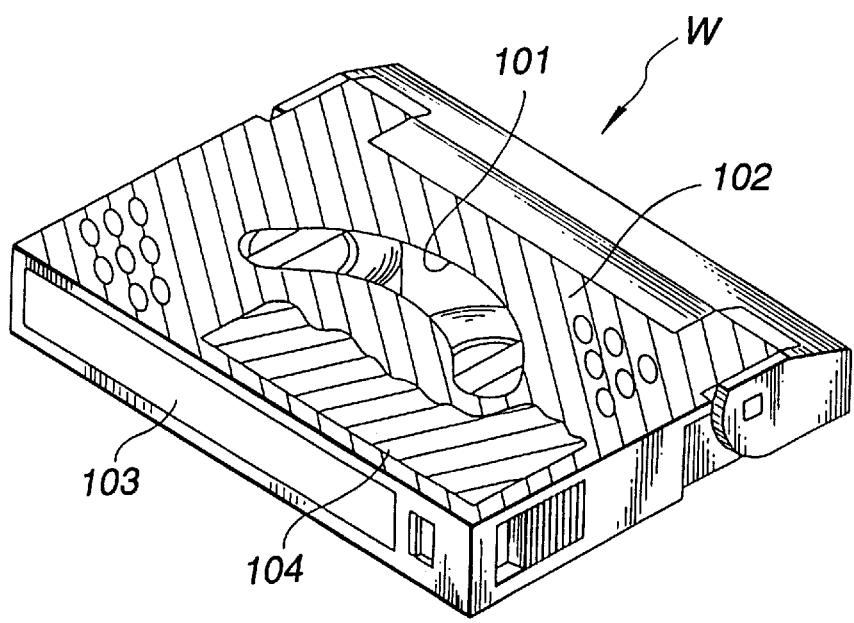

In FIGS. 1A and 1B, a casing W for the recording medium according to the present invention is in the form of the tape cassette. A picture patterns 102 is printed with two or more colors on the cassette surfaces excepting a surface in which a transparent window 101 is formed. A back label 103 is bonded on the back surface of the tape cassette W.

The picture pattern 102 printed on the surfaces of the tape cassette W is a logo-mark asserting that the tape cassette is a product of a certain and certain company or one of various designs intended for enhancing the commercial value of the tape cassette. If the recording medium housed within the tape cassette W is a video cassette, for example, the picture pattern 102 is a design showing the features of recording contents of the video tape, such as a scene of an athletic meeting or a shot of a motion picture.

The picture pattern 102 includes an index 104 into which the letters or symbol marks may be made using a writing instrument 114, such as a pencil.

Figure 2:
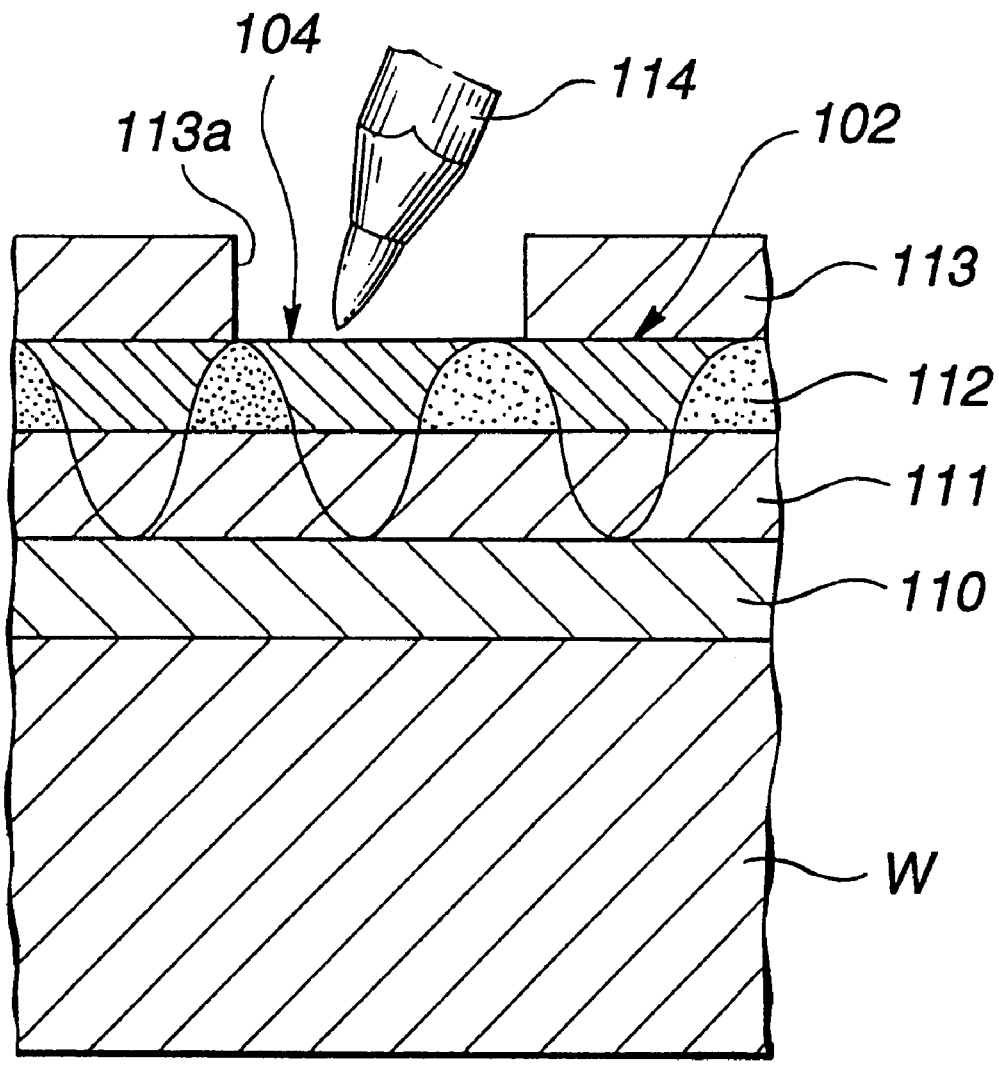
FIG. 2 is a cross-sectional view showing a laminated structure of a printing layer formed on the casing shown in FIG. 1.

For forming the printing surface 102, a highly adhesive layer 110 is first formed on the outer surface of the tape cassette W, as shown in FIG. 2. On the highly adhesive layer 110 is formed a white ink receptive layer 111, on which a colored layer 112 is formed. A top coating layer 113 is formed as an upper most layer to complete the printing surface. The compositions and the functions of these layers 110 to 113 will be explained subsequently in detail.

With the tape cassette W, the top coating layer 113 is formed on the portion of the surface of the colored layer 112 with the exception of the index 104 in which letters or symbol marks can be written with the writing instrument 114.

FIG. 3 shows the casing for the recording medium according to the present invention in the form of a disc cartridge W. On the surface portion of the disc cartridge W, excluding the area set for a shutter 121 and for movement of the shutter 121, there is printed the picture pattern 102 with two or more colors.

Similarly to the picture pattern printed on the tape cassette W, the picture pattern 102 printed on the disc cartridge W is a so-called logo-mark for asserting that the product belongs to a particular company, or various designs for enhancing the commercial value of the product. If the disc cartridge houses a disc for music, the picture pattern 102 is a photo for the face of the artist or a landscape corresponding to the mental image of the music.

The picture pattern 102 includes an index 104 in which to enter letters or symbol marks with the writing instrument 114.

For forming the printing surface 102, a highly adhesive layer 110 is first formed on the outer surface of the tape cassette W, as in the case of the tape cassette W shown in FIG. 2. On the highly adhesive layer 110 is formed a white ink receptive layer 111, on which a colored layer 112 is formed. A top coating layer 113 is formed as an upper most layer to complete the printing surface. With the disc cartridge W, the top coating layer 113 is similarly formed on the portion of the surface of the colored layer 112 excluding the index 104 in which to enter the letter or symbol marks with the writing instrument 114.

It will be seen that, with the tape cassette and the disc cartridge W according to the present invention, the index 102 in which to enter letters or symbol marks with the writing instrument 114 is included in a portion of the picture pattern 102 printed on its outer surface. As a result thereof, it becomes possible to enter an explanation of the recording contents or the title without impairing the quality of picture patterns, such as logo-marks asserting that the tape cassette or disc cartridge is the product of a particular company or various designs appended for enhancing the commercial value of the product or stating the features of the recording contents. Besides, the tape cassette or the disc cartridge may be used as gifts or events of the ultimate user or the intermediate user for enhancing its usage and application of the tape cassette or the disc cartridge W.

The tape cassettes or disc cartridges W may be easily put into order or stored by relying on the indication on a back label 103 as known per se and entry of the letters or the like on the index 102 in accordance with the present embodiment.

If the picture pattern 102 printed on the outer surface of the tape cassette or disc cartridge W is a design showing the feature of the recording contents recorded thereon, such as a scene of an athletic meeting, a shot of the motion picture, or a photo of the face of the artist, it becomes possible for the user to maintain his or her personal library.

The method according to the present invention for printing the picture pattern on the printing object W, such as the tape cassette or the disc cartridge, is hereinafter explained by referring to FIG. 2.

According to the printing method of the present invention, a highly adhesive layer 110 is first formed on the surface of the printing object W. A white ink receptive layer 111, containing the filler and the binder, is then formed as the second layer. The full-color printing is then performed, followed by ultimate top coating.

If the printing object W is a tape cassette shown in FIGS. 1A and 1B, the highly adhesive layer 110 as the first layer is formed on the portion of the outer surface of the tape cassette W excluding the transparent window 101. The highly adhesive layer 110 plays the role of an anchoring layer or an adhesive layer for improving the tight bonding between the second and the overlying layers 111, 112 and 113 on one hand and the synthetic resin or the like cassette material on the other hand.

The components used for the highly adhesive layer 110, such as synthetic resin, which may be suitably selected by taking into account the adhesiveness thereof to the constituent material of the printing object W, may be enumerated by (i) a solvent-based adhesive for dissolving and bonding of the cassette surface, (ii) a solvent-based silk screen printing ink, (iii) alumina, water-soluble resin and water. A double-sided tape having its upper surface coated with an aqueous paste and its lower surface coated with an adhesive for bonding to the outer cassette surface may also be employed in place of the highly adhesive layer 110.

The above component(s) is formed to a thickness of 50 to 500 μm, preferably to a thickness on the order of 200 μm.

The white ink receptive layer 111, containing the filler and the binder, is then formed as the second layer. The layer 111, also containing white-tinted pigments for assisting in the coloration of the water-soluble paint ink, functions as an underlying layer for subsequent full-color printing. This layer 111 is formed to a thickness of 3 to 100 μm.

The paint applied for forming the layer 111 may have the following illustrative composition:

| silica | 100 |
| gelatin | 30 |
| (aqueous) synthetic resin | 5 |
| water | 200 to 280 |

In the above composition, the amounts are indicated by parts by weight.

As the filler, alumina, calcium carbonate, talc, diatomaceous earth, zeolite or the like material capable of absorbing a large quantity of water, may also be employed, besides silica. It is desirable to fabricate the white ink receptive layer so that it is capable of absorbing the ink in an amount of not less than 10 ml/cm$^2$. As the binder, water-soluble high molecular material, such as polyacrylamide, starch or gum arabic may also be employed in place of gelatin or polyamide alkoxide. The synthetic resin may be exemplified by polyamide resin or alkyd resin. If the layer is formed by ink jet printing, the above-given proportions of the components may be suitably changed depending on the nozzle diameter, ground color of the printing object or the contrast ratio.

The colored layer 112 is formed on the layer 111 by natural color photographic printing or full-color printing. The picture pattern 102 formed by the full-color printing is a so-called logo-mark for asserting that the product belongs to a certain and certain company, or various designs for enhancing the commercial value of the product. Above all, if the printing object W is a video tape cassette, for example, the picture pattern is a design showing the characteristics of the recording contents of the video tape in two or more colors. The picture pattern 102 includes an index 104, in white or intermediate color, which is a writing region for writing with a writing instrument 114, such as a pencil.

The water-soluble paint ink may have the following composition:

| dye | 2 to 3 |
| diethyl alcohol | 30 |
| water | 50 to 70 |

The amounts are given parts by weight.

For full-color printing, plural different white ink receptive layers, such as the white ink receptive layer having acceptability with respect to the water-color ink or the white ink receptive layer having acceptability with respect to the oil ink, are provided for enabling desired ink types to be selectively employed for printing depending on the desired standard or specified design. The full-color printing may also be performed by non-contact printing, such as ink-jet printing. Silk screen printing, PAD printing or offset printing may naturally be employed.

Above all, if the non-contact ink jet printing as later explained is employed, small quantity multi-variety printing becomes possible after assembling.

Figure 3A:
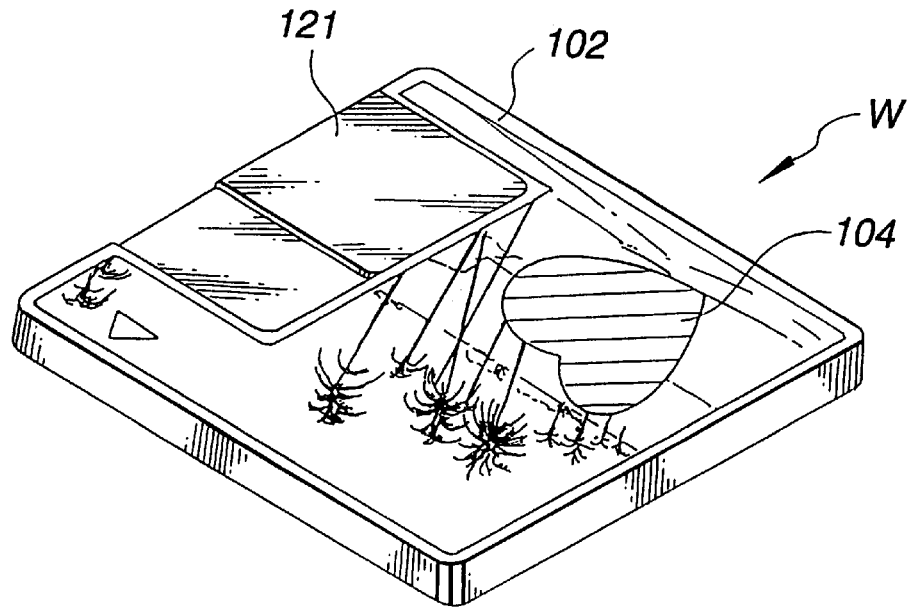
FIGS. 3A and 3B are perspective views showing an embodiment of the casing for the recording medium as applied to a disc cartridge having a magnetic disk, an optical disc or a magneto-optical disc rotatably housed therein.
Figure 3B:
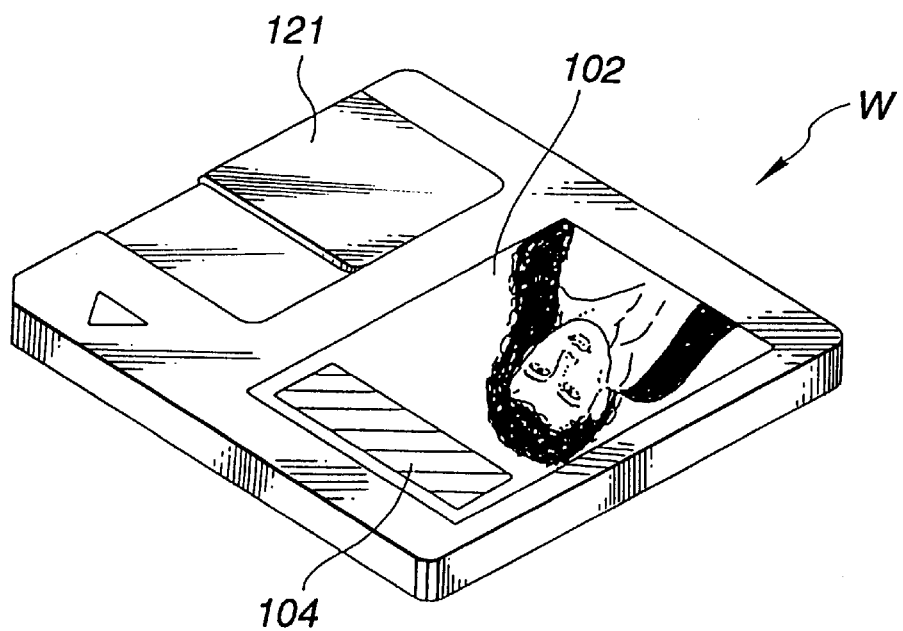
Figure 4:
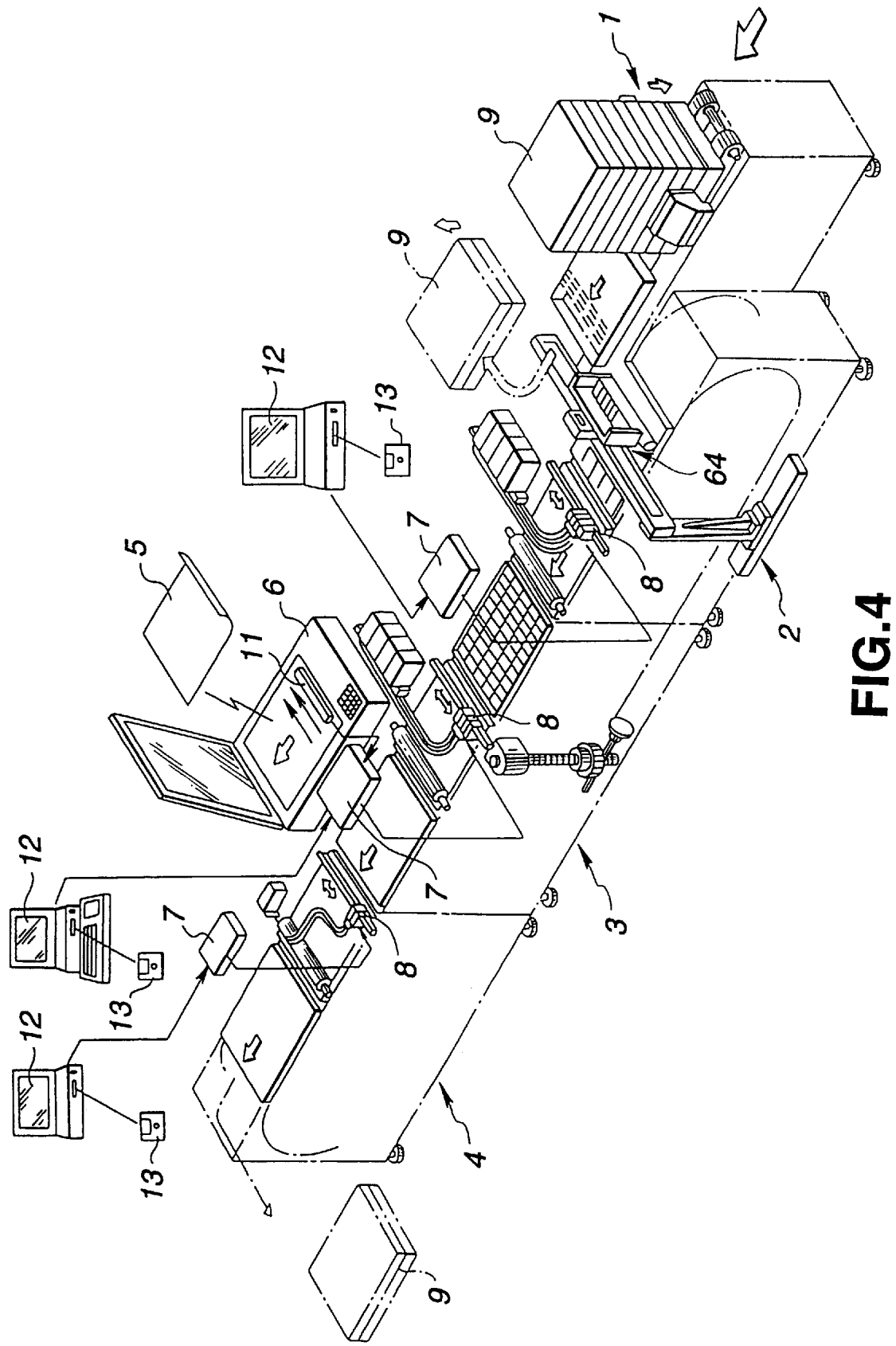
FIG. 4 is an exploded perspective view showing an arrangement of a printing system for implementing the printing method according to the present invention.

If the printing object W is a tape cassette, for example, as shown in FIGS. 1A and 1B, stacked films consisting of the highly adhesive layer 110, white ink receptive layer 111 and the colored layer 112 are not formed on the portion of the printing object corresponding to the transparent window 101. On the other hand, if the printing object W is a disc cartridge, for example, as shown in FIGS. 3A and 3B, stacked films consisting of the highly adhesive layer 110, white ink receptive layer 111 and the colored layer 112 are not formed on the portion of the printing object corresponding to the shutter 121 and the range of movement of the shutter 121.

The transparent top coat layer 113 is then formed on the colored layer 112. In the case of the tape cassette, shown in FIGS. 1A and 1B, the top coat layer 113 is formed on the portion of the cassette surface excluding the area corresponding to at least the transparent window 101 and the index 104, whereas, in the case of the disc cartridge shown in FIGS. 3A and 3B, the top coat layer 113 is formed on the portion of the cartridge surface excluding the area corresponding to at least the shutter 121 and the range of movement of the shutter 121. In this manner, only the portion of the colored layer 112 corresponding to the index 104 is exposed to outside via an opening 113a in the top coat layer 113.

The top coat layer 113 plays the role of coating the colored layer 112 and being permeated to the highly adhesive first layer 110 to improve tight bonding of the above layers 110 to 113 in their entirety.

The top coat layer 113 may be based on the oily substances, that is the resin soluble in organic solvents, or the aqueous substances, such as water-soluble resin or aqueous varnish. Examples of the resins include alkyd resin, polyurethane, polyamide, phenolic resin, melamine resin, polyvinyl formal, polymethyl methacrylate, polyvinyl acetate, polyvinyl butyral and synthetic rubber based synthetic resin latexes.

A top coating agent, obtained on adding 70 wt % of water and 10 to 20 wt % of the organic solvent, is applied to a thickness of 3 to 300 μm on the colored layer 112 formed by the full-color printing. If the resistance against alcohols and scratch-proofness of the colored layer 112 are taken into account, it is desirable for the coating agent to be applied to a larger thickness of 200 to 300 μm.

With the printing method of the present invention, the top coating layer 113 is formed on the portion of the colored layer 112 excluding the index 104 of the picture pattern 102. Consequently, letters or symbol marks may be entered with the writing instrument 114 on the surface of the colored layer 112 exposed to outside via an opening 113a, that is the surface of the index 104.

With the above printing method, the top coat layer 113 is selectively formed on the colored layer 112 for forming the opening 113a in the portion of the top coat layer 113 in register with the index 104 of the picture pattern 102. Alternatively, the colored layer 112 may be selectively formed so that the opening is formed in the portion of the picture pattern 102 in register with the index 104. In such case, the underlying white ink receptive layer 111 is preferably selected so that it exhibits writability and printability for the intermediate color and resistance to writing pressure so that letters or the like entered with the writing instrument 114 on the white ink receptive layer will be legible.

Referring to FIGS. 4 through 32, the printing system for implementing the printing method according to the present invention is explained. It is noted that, with the present printing system, full-color printing is made of a color negative on the specified portions of the printing object W with a non-contact printing head.

With the present printing system, plural tape cassettes contained in the casing are processed by solid printing by way of an underlying layer treatment, followed by full-color printing with three prime colors and top coating for forming a protective film. Thus the printing system is made up of a printing object supplying unit 1, into which the plural tape cassettes are introduced, a full-color printing unit 2, a full-color printing unit 3 and a top coating section 4, as shown for example in FIG. 4.

With the present printing system, the white solid printing unit 2, the full-color printing unit 3 and the top coating unit 4 are basically the same in construction. Thus the following description of the printing system is centered around the description of the full-color printing unit 3.

Figure 5:
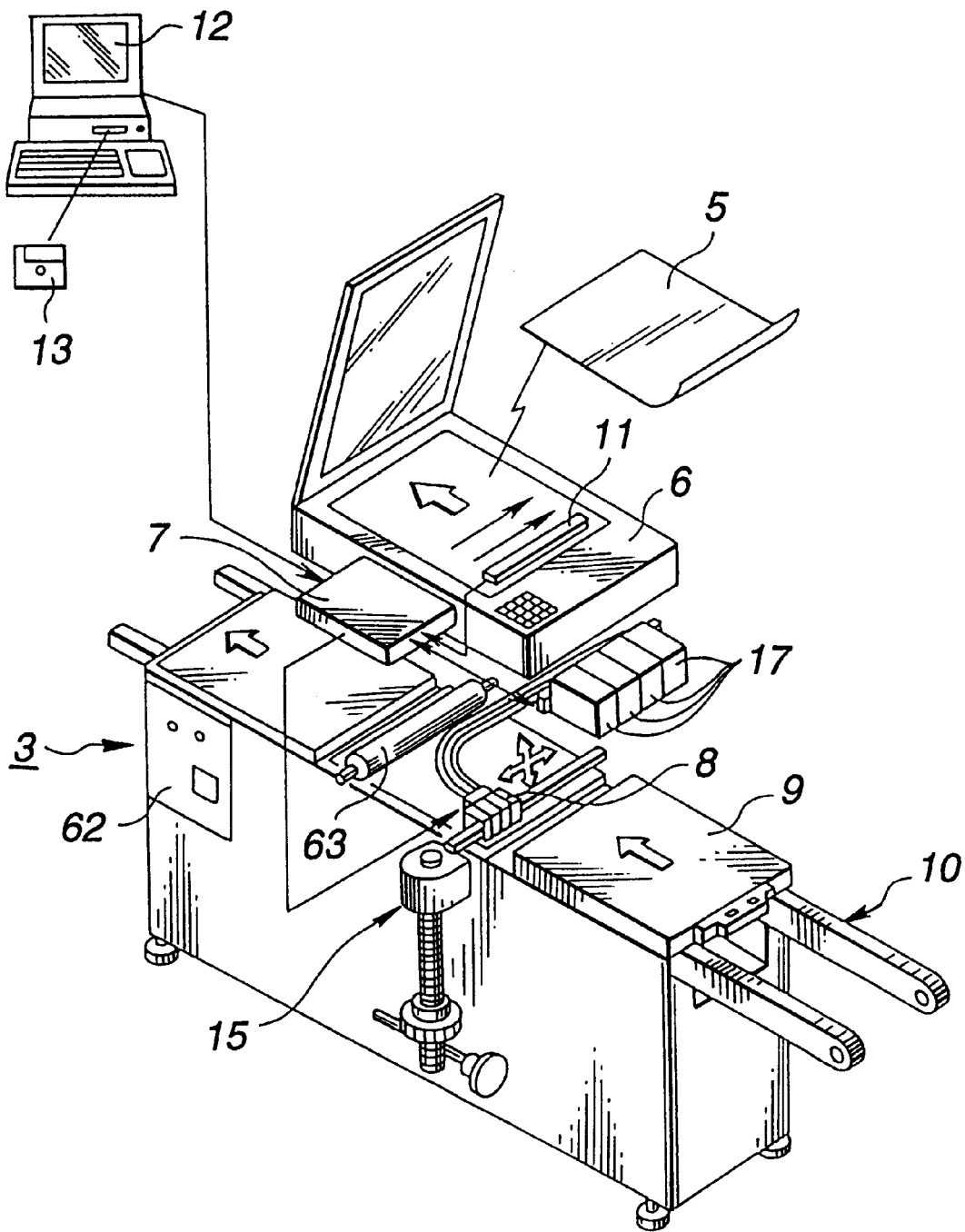
FIG. 5 is an enlarged perspective view showing a full-color printing section of the printing system shown in FIG. 4.

The full-color printing unit 3 is made up of an image reader 6 for reading the picture information of a design manuscript 5 having a color design picture pattern thereon, an image processor 7 for converting the read-out signals into a pre-set picture, a non-contact printing head 8 operated by the information converted into the image, and a transporting mechanism 10 responsive to output signals of the image processor 7 for transporting a container vessel 9 for the printed objects containing plural tape cassettes W as the printing objects in a timed relation to the printing head 8, as shown in FIG. 5.

The image reader 6 has a color CCD scanner 11, by means of which the image reader 6 reads the picture information for the design manuscript 5 carrying the pre-designed color picture patterns, and color-separates the picture information on the pixel basis. If printing is to be made on a video tape cassette having a tape width equal to 8 mm, an A-4 format copy sheet carrying eight pictures patterns thereon is used as the design manuscript 5. If printing is to be made on a small-sized magneto-optical disc 64 mm in diameter, having audio signals continuing for 74 minutes recorded thereon, an A-4 format copy sheet carrying 16 picture patterns drawn thereon is used as the design manuscript 5. The number of the picture patterns drawn on the design manuscript 5 is equal to the number of the tape cassettes on which printing is to be made simultaneously.

The picture patterns drawn on the design manuscript 5 may be a logo-mark (ornamental design letters) for asserting that the product belongs to a particular company or a variety of designs intended for enhancing the commercial value of the product or stating characteristics of the recording contents recorded on the tape. Since the printing object W is a tape cassette in the present example, the picture pattern is a rectangular pattern in e.g. a white ground color in register with the transparent window 101 in the tape cassette W. Besides, the pattern includes areas in a specific neutral tint as the indices 104 in which to enter the letters or the like.

The design manuscript may be directly produced by graphic designing by a word processor or a computer 12. The pre-designed picture or image information may be stored on a magnetic disk 13 such as a floppy disk. If the picture pattern is produced directly by the graphic designing, it is directly outputted to the picture processor 7 via the computer 12. If the picture information is stored on the magnetic disk 13, it is outputted to the computer 12 and subsequently to the picture processor 7. This eliminates the necessity of preparing the design manuscript 5 to reduce the reading time significantly.

The picture processor 7 color-separates R, G and B color manuscript digital signals, color-separated on the pixel basis by the image reader 6, into prime colors R, G and B. The picture processor 7 outputs the color-separated color digital signals to the printing head 8, as later explained, while outputting operating signals to the transporting mechanism 10 in synchronism with the movement of the printing head 8.

The printing head 8 is an ink-jet recording system printing head in which the ink is ejected from the forward end of a fine nozzle towards the printing object for effecting printing in a non-contact state. The printing head 8 is responsive to the color-separated digital signals outputted from the picture processor 7 to effect full-color printing on the portions of the tape cassette W specified for printing.

Figure 6:
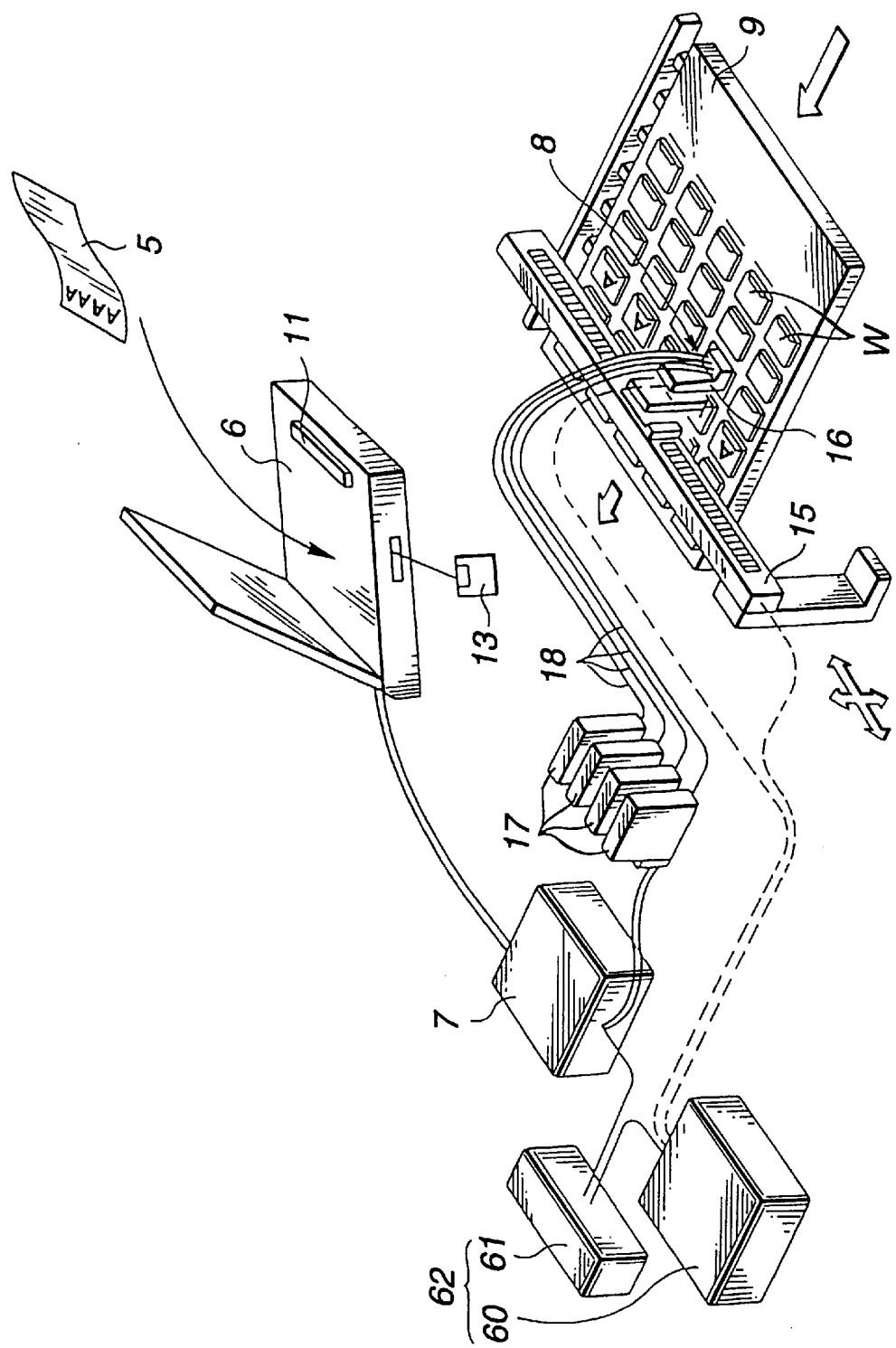
FIG. 6 is a perspective view showing printing head portion of the full-color printing section of the printing system shown in FIG. 4.

That is, the printing head 8 is provided to a head actuating mechanism 15 that is supporting the printing head 8 with freely movement vertically and horizontally to the plural tape cassettes W contained container vessel 9, as shown in FIG. 6. The printing head 8 ejects ink from nozzles provided in a head part 16 to effect full-color printing on the portions of the tape cassette W specified for printing.

To the printing head 8 are connected ink pipes 18 led out of ink tanks 17 in which three prime colors of cyan, magenta and yellow and sepia are stored. The ink pipes 18 led out of the ink tanks 17 are connected to nozzles provided in a head part 16 of the printing head 8. The ink tanks 17 are connected to the picture processor 7 and come into operation responsive to the color-separated digital signals for supplying the inks to the respective nozzles.

The printing head 8 is provided with a detector for detecting surface irregularities of the printing object W. The detector includes a pair of profiling sensors 21 and 22 provided with contactors 19 and 20 contacted with the surface of the tape cassette W, as shown for example in FIGS. 8 and 9. The profiling sensors 21, 22 are secured to the head part 16 in a straight line extending along the running direction of the tape cassettes W, with the foremost parts of the contactors 19 and 20 projected from the ink ejecting surface of the head part 16. These contactors 19 and 20 are capable of omnidirectional detection through an angular extent of 360°, and are contacted with the surface of the tape cassette W for supplying detection signals corresponding to the surface irregularities of the tape cassette to a system controller as later explained. Based on the detection signals, the head actuating mechanism 15 is actuated under commands from the system controller to control the vertical height of the printing head 8.

In this manner, the distance of the printing head 8 from the tape cassette W may be maintained constant at all times irrespective of whether the tape cassette surface is a planar surface, an irregular surface, an inclined surface or a curved surface. The result is that printing may be made from the planar surface continuously to the irregular surface, inclined surface or the curved surface with a high printing quality without color fluctuations or color dropout or without producing blurred letter edges. The printing head 8 is free of direct contact with the tape cassette W, so that printing may be made to a finish without an external pressure being exerted to the tape cassette W.

Figure 10:
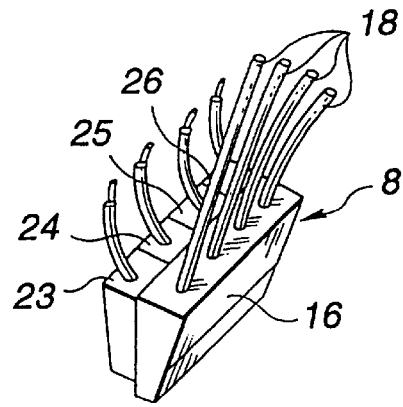
FIG. 10 is an enlarged perspective view showing essential parts of a printing head provided with a laser displacement sensor.
Figure 11:
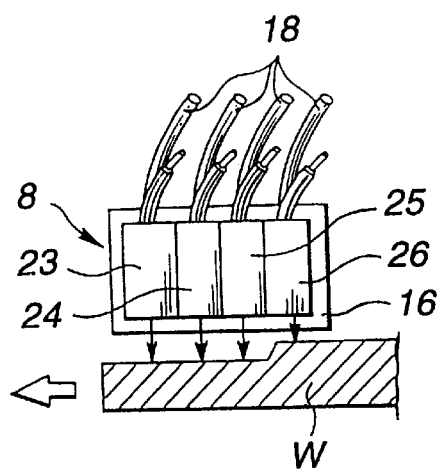
FIG. 11 is an enlarged side view of FIG. 10 for illustrating the state of printing by the printing head provided with the profiling sensor.

As the detection device for detecting the irregularities on the surface of the tape cassette W, any of the non-contact sensors, such as the laser displacement sensor, ultrasonic sensor or the photoelectric sensor may be employed. Taking an example of the laser displacement sensors, four laser displacement sensors 22, 23, 24 and 25 are secured to the head part 16 in a straight line extending along the running direction of the tape cassette W, as shown in FIGS. 10 and 11.

Thus the laser displacement sensors 23, 24, 25 and 26 output detection signals conforming to the surface irregularities on the tape cassette. These detection signals are outputted to the system controller as later explained. The head actuating mechanism 15 is actuated under the commands from the system controller based on the detection signals to control the vertical position of the printing head 8.

Figure 12:
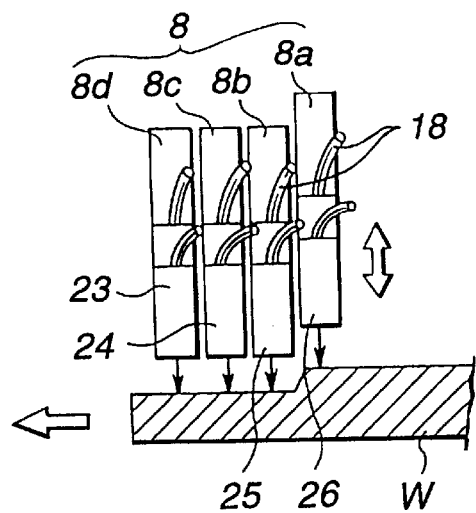
FIG. 12 is an enlarged side view of a printing head fitted with separate laser displacement sensors for illustrating the state of printing by the printing head.
Figure 13:
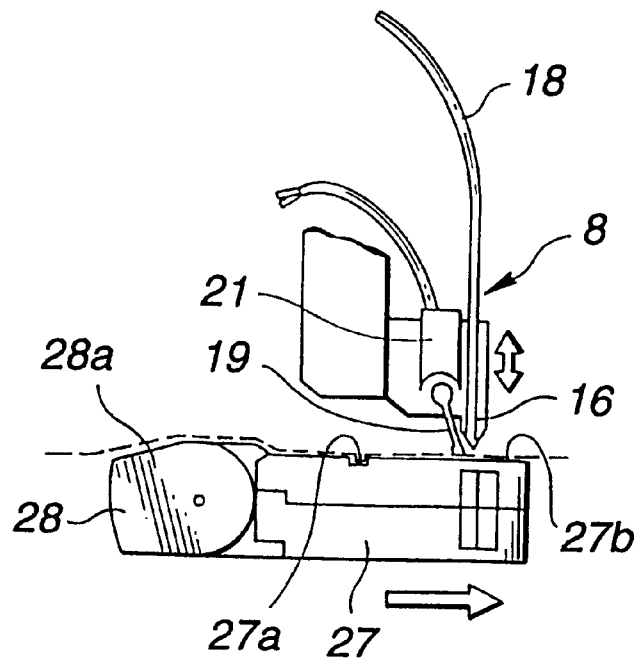
FIG. 13 is a side view showing the state of printing on a video tape cassette by the printing head provided with the profiling sensor.

The laser displacement sensors 23 to 26 are provided in association with printing heads 8*a*, 8*b*, 8*c* and 8*d* provided for respective colors, as shown in FIG. 12. The vertical positions of the printing heads 8*a* to 8*d* may be controlled independently relative to the tape cassette W on the basis of detection signals supplied from the laser displacement sensors 23 to 26.

By providing the detector detecting surface irregularities on the printing object W on the printing head 8, high-quality printing may be made on any printing objects regardless of the shape of the printing objects and of whether the printing object is hard or soft. By the position-controlled printing head 8, the picture pattern may be printed continuously from a curved surface 28*a* of an opening/closing lid 28 up to a concave surface 27*a* and a planar surface 27*b* of the tape cassette main member.

Figure 14:
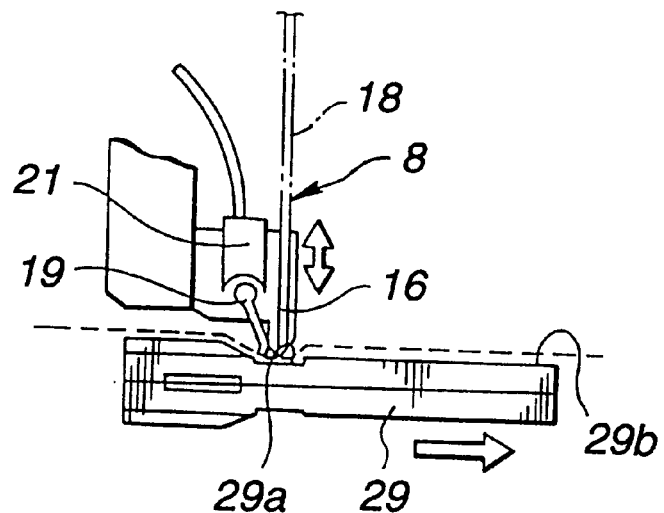
FIG. 14 is a side view showing the state of printing on a tape cassette by the printing head provided with the profiling sensor.

If the printing object is an audio tape cassette 29, the vertical position of the printing head 8 relative to the audio tape cassette 29 is similarly controlled by the profiling sensors 21, 22, as shown in FIG. 14. By the position-controlled printing head 8, the picture pattern may be printed continuously from a concave surface 29*a* up to a planar surface 29*b* of the tape cassette main member.

Figure 15:
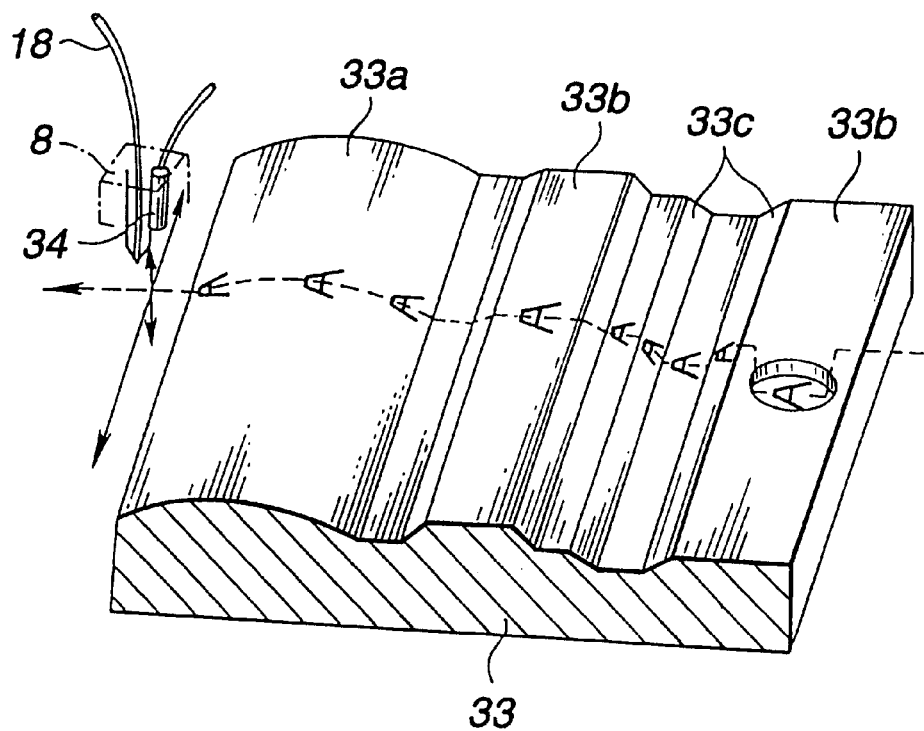
FIG. 15 is a perspective view showing the state of printing on a profiled printing object by the printing head fitted with a laser displacement sensor.
Figure 16:
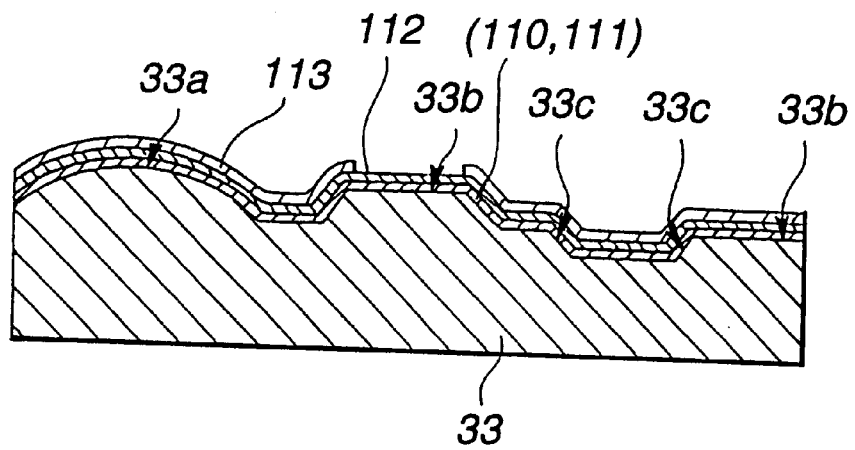
FIG. 16 is a cross-sectional view showing the state in which white solid printing and full-color printing are performed sequentially on the profiled printing object.

If the printing object is a profiled plastic plate 33, such as a container casing, having curved surfaces 33*a*, irregular surfaces 33*b* and inclined surfaces 33*c*, existing together, as shown in FIGS. 15 and 16, the vertical position of the printing head 8 relative to the plastic plate 33 is controlled by a non-contact sensor 34, such as an ultrasonic sensor or a photoelectric sensor. The picture pattern may be printed continuously from curved surfaces 33*a* up to irregular surfaces 33*b* and inclined surfaces 33*c* by the position-controlled printing head 8. In the example shown in FIGS. 15 and 16, letters A are printed on the printing object.

Figure 17:
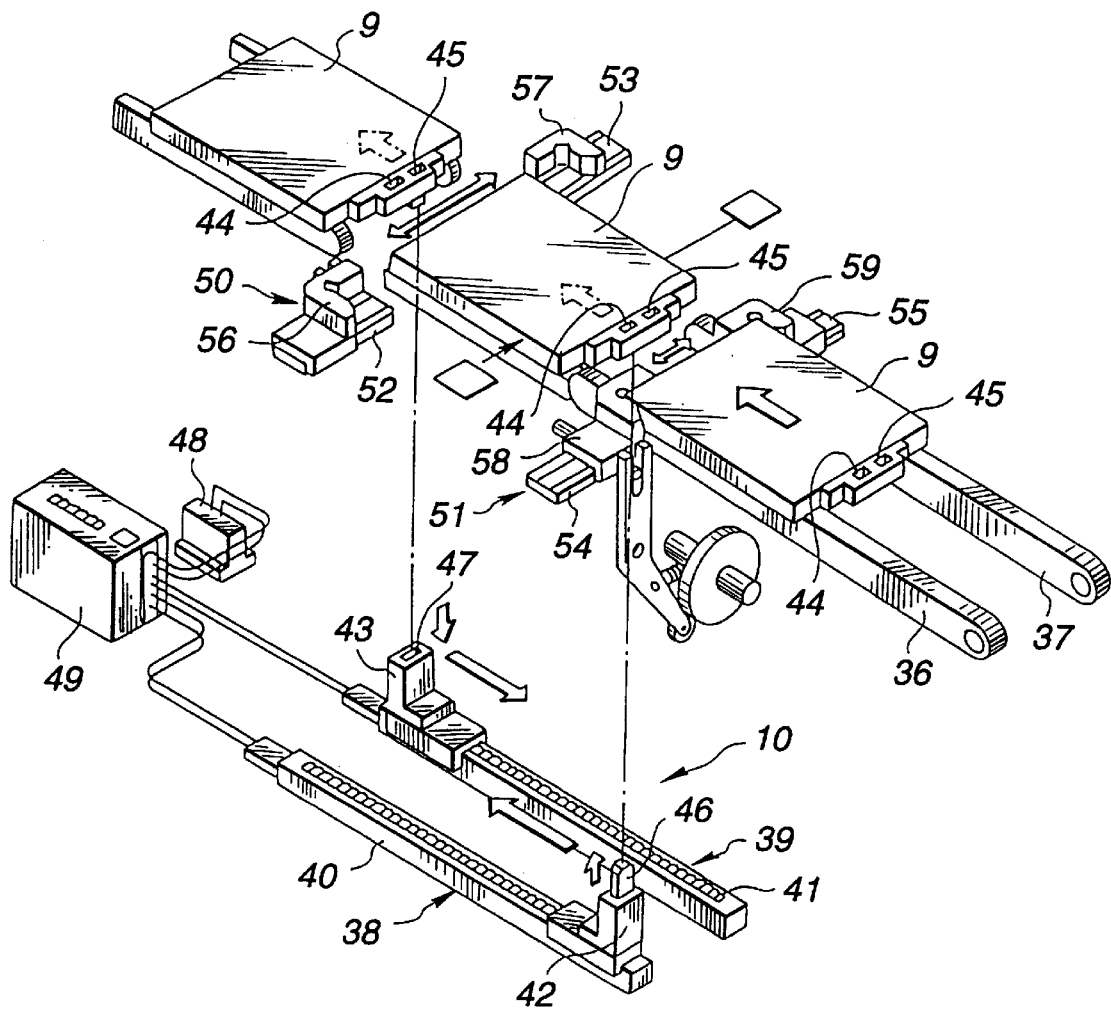
FIG. 17 is an exploded perspective view showing an arrangement of a transporting mechanism of the printing system shown in FIG. 4.

The transporting mechanism 10 is responsive to an actuating output signal from the picture processor 7 to transport the container vessel 9 containing plural tape cassettes W in a timed relation to the scanning of the printing head 8. The container vessel 9 is transported in a timed relation to the scanning by the printing head 8 for assuring high-quality printing. The transporting mechanism 10 includes feed units 38, 39 for transporting the container vessel 9 along a pair of spaced apart parallel transporting rails 36, 37 as shown in FIG. 17.

The feed units 38 and 39 are made up of a pair of parallel feed rails 40, 41 mounted below the transporting rails 36, 37 and slides 42, 43 adapted for sliding on these feed rails 40, 41. The slides 42, 43 are provided with tray feed hooks 46, 47 adapted for being passed through feed hook holes 44, 45 formed in the container vessel 9.

These tray feed hooks 46, 47 are adapted for being protruded out of or receded into the inside of the slides 42, 43. The tray feed hooks 46, 47 are protruded out of the slides 42, 43 when the container vessel 9 is to be delivered to the top coating section 4 of the next step, while being receded into the inside of the slides 42, 43 otherwise.

The feed units 38, 39 are controlled by a sequencer 48 and a controller 49. That is, when the container vessel 9 containing tape cassettes W processed with white solid printing by the preceding step is supplied to the feed units, the feed hook 46 associated with the feed unit 38 is protruded out of the slide 42 so as to be engaged in the associated feed hook hole 44. The container vessel 9 is fed in synchronism with the scanning of the printing head 8 and, after the end of the full-color printing, is fed to the top coating section 4 of the next step.

The other feed unit 39 is returned as from the position at which the feed unit has delivered the container vessel 9 to the top coating unit 4, at a speed faster than the transfer speed used for printing, with the feed hook 47 remaining receded into the inside of the slide 43. Consequently, by the alternate feed operation of the two feed units 38, 39, the container vessel 9, having housed therein the white solid printed tape cassettes W, may be continuously transported to the top coating section 4 of the next step without interruptions. The transporting mechanism 10 includes stops 50, 51 for halting the container vessel 9 at a pre-set position. These stops 50, 51 are made up of slide rails 52, 53 and 54, 55, mounted at right angles to and on both sides of the transporting rails 36, 37, and positioning members 56, 57 and 58, 59 slid on the slide rails 52, 53 and 54, 55 for positioning the container vessel 9.

The positioning members 56, 57 and 58, 59 are slid on the slide rails 52, 53 and 54, 55 into abutment with the corners of the container vessel 9 for regulating the position of the container vessel 9. These stops 50, 51 are provided at an area for positioning the container vessel 9, transported from the white solid printing section 2 as far as the full-color printing section 3, in position for full-color printing, and at the top coating section of the next step, respectively.

Figure 7:
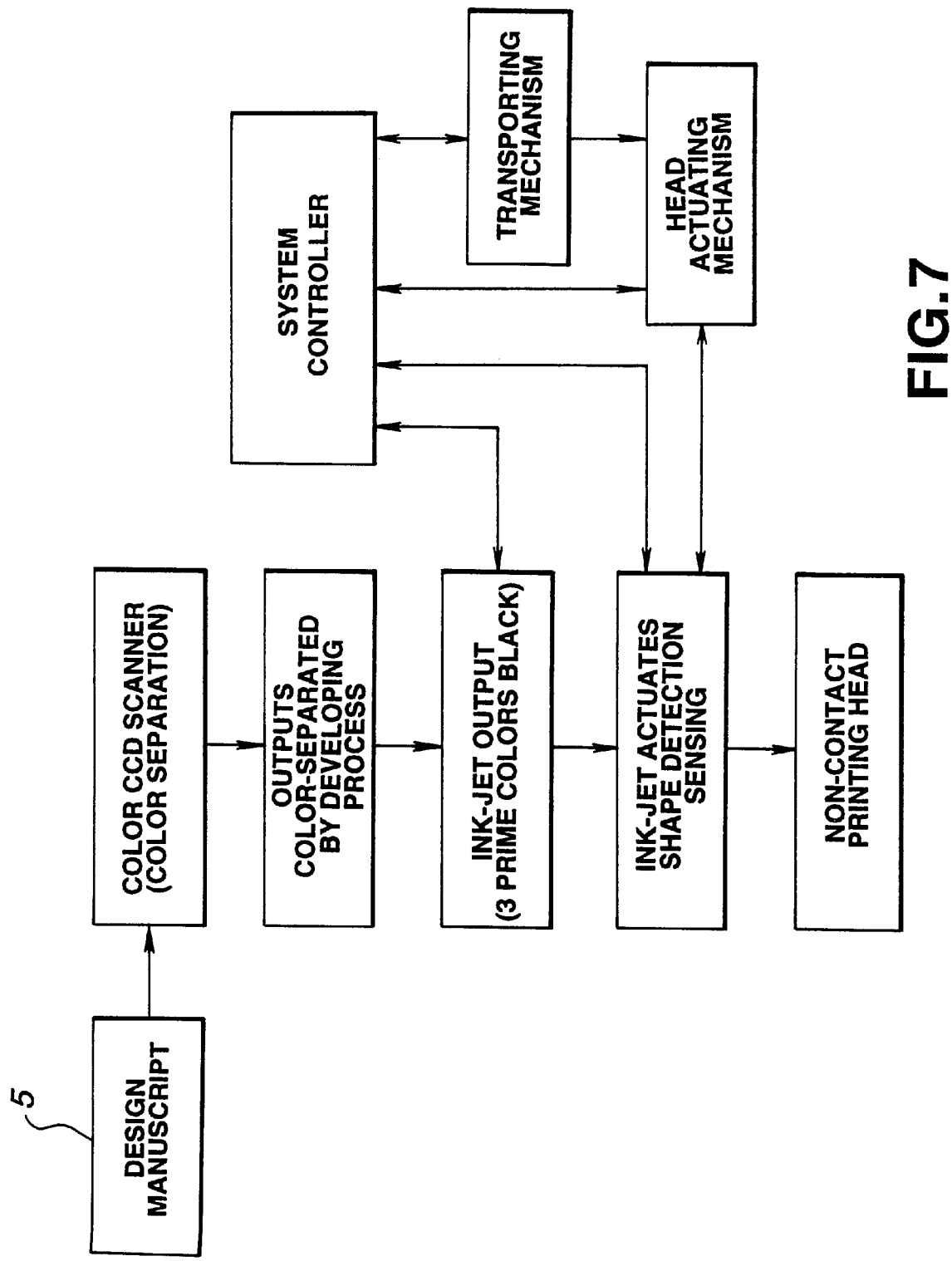
FIG. 7 is a flow chart showing the operation of the full-color printing section of the printing system shown in FIG. 4.
Figure 8:
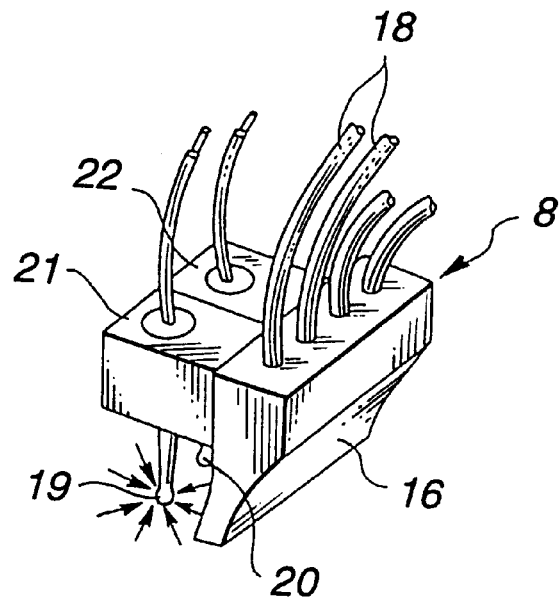
FIG. 8 is an enlarged perspective view showing essential parts of a printing head fitted with a profiling sensor.
Figure 9:
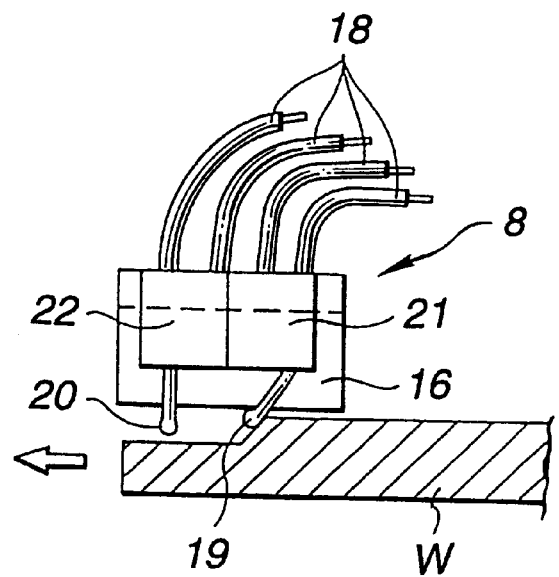
FIG. 9 is an enlarged side view of FIG. 8 for illustrating the state of printing by the printing head provided with the profiling sensor.

It is noted that the operation in the above-described full-color printing unit 3 is performed in accordance with the processing block diagram shown in FIG. 7. First, the design manuscript 5, carrying pre-designed color picture patterns, is read by a color CCD scanner 11, and the picture information thus read is color-separated on the pixel basis. Alternatively, the picture information resulting from the graphic designing by the computer 12 is directly outputted to the picture processor 7. Still alternatively, the picture or image information stored on the magnetic disk 13 is directly outputted to the picture processor 7.

The digital color manuscript signals, color-separated on the pixel basis, are color-separated by the picture processor 7 for each of the R, G and B colors. Subsequently, the color-separated digital signals are outputted at the printing head 8, at the same time as operating signals actuating the container vessel 9 containing tape cassettes W are outputted.

The printing head 8, the head actuating mechanism 15 and the transporting mechanism 10 are controlled at this time by a system controller 62. The container vessel 9 is moved in a timed relation to the movement of the printing head 8 under control by the system controller 62. At this time, detection signals from the profiling sensors 21, 22 provided on the printing head 8 are transmitted to the system controller 62. The head actuating mechanism 15 is controlled by a corresponding output of the system controller 62 so that the distance between the printing head 8 and the tape cassette W will be constant.

Under the above-described controlled conditions, the color inks are selectively ejected via the ink nozzles of the printing head 8 for effectuating full-color printing on the tape cassette W on the basis of the pre-set picture information. Finally, the printed surface is finished by a pressure roll 63.

The white solid printing unit 2 is constructed similarly to the full-color printing unit 3. That is, the picture or image information stored on the magnetic disk 13 is directly outputted to the computer 12, the corresponding information of which is outputted to the picture processor 7. Based on output signals of the picture processor 7, the non-contact printing head 8 and the container vessel 9 for the printing objects are moved in unison with each other, under control by the system controller 62, for effectuating white solid printing on the tape cassette W.

The white solid printing is effectuated as an underlying ground treatment in readiness for the next full-color printing step, and consists in printing the ink composed of white-tinted pigments containing high density anchoring agents on the printing object W for forming the highly adhesive layer 110 and the white-tinted ink receptive layer 111 on the printing object W, as shown in FIG. 2. In the case of the tape cassette W, which is of the gray to black color proper to the resin, it is necessary to effectuate the white solid printing four times or so for improving the coloration. The picture information for this step includes the shell window producing pattern if the printing object is the tape cassette W.

The white solid printing unit 2 includes a handling mechanism 64 for transferring the container vessel 9, containing plural tape cassettes W to be supplied to the supplying unit 1, to the white solid printing unit 2. The handling mechanism 64 includes a handling unit 65 for holding the container vessel 9 by the suction under vacuum, as shown in FIG. 18.

Figure 18:
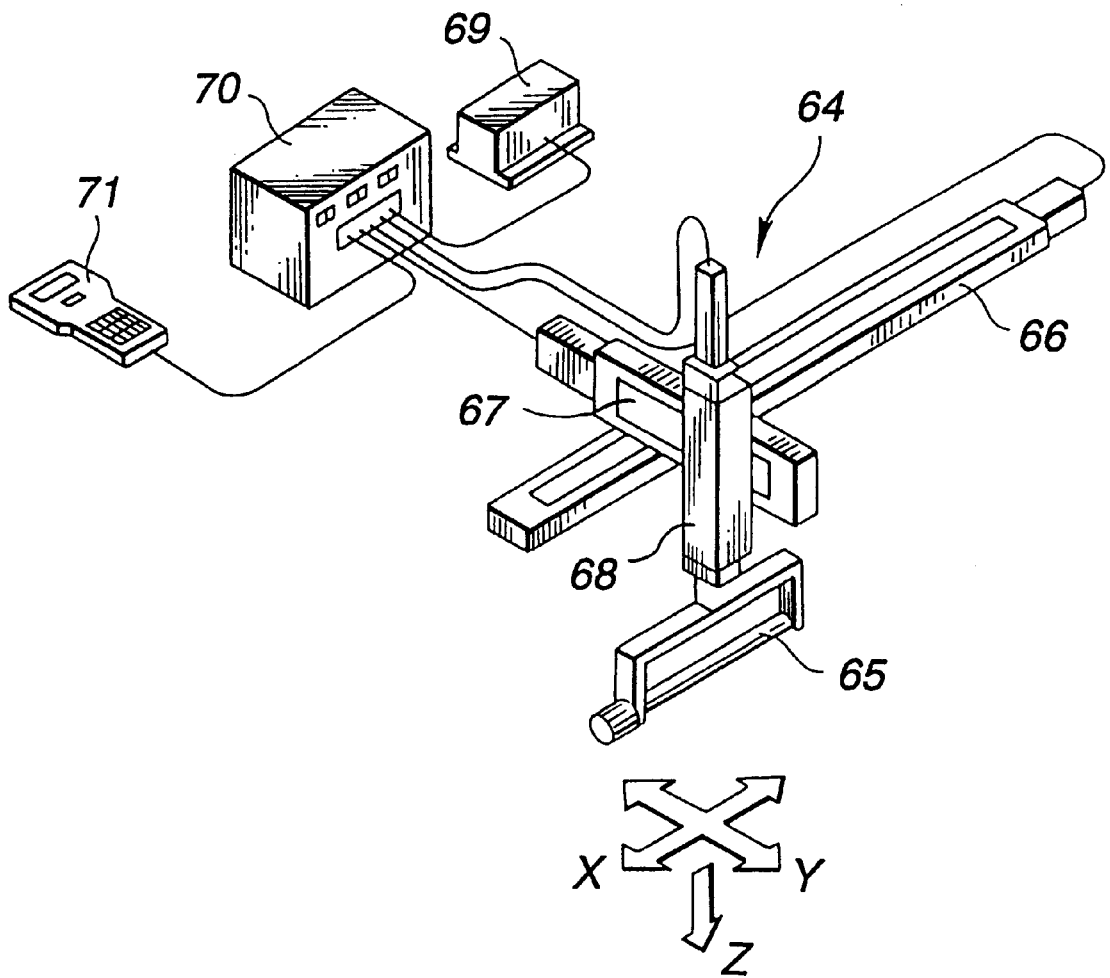
FIG. 18 is a perspective view showing a handling mechanism of the printing system shown in FIG. 4.

The handling unit 65 is moved along a first rail 66 in a direction shown by an arrow X in FIG. 18, while being moved along a second rail 67, mounted at right angles to the first rail 66, in a direction shown by an arrow Y in FIG. 18. The handling unit 65 is also movable in a direction shown by an arrow Z in FIG. 18 by a lifting mechanism 68 provided on the second rail 67. The handling unit 65 is capable of three-dimensional movement as indicated by the arrows X, Y and Z in FIG. 18 under control by a control unit made up of a sequencer 69 and a controller 70.

Thus the container vessel 9 supplied to the supply unit 1 for the printing objects is handled and transferred to the white solid printing unit 2 by the movement of the handling unit 65. Meanwhile, the handling unit 65 is driven by a remote-control unit 71 connected to the controller 70.

The top coating unit 4 is arranged and constructed similarly to the full-color printing unit 3. That is, the picture or image information stored on the magnetic disk 13 is directly outputted to the computer 12, the corresponding information of which is outputted to the picture processor 7. The picture or image information stored on the magnetic disk 13 is the pattern for forming a protective film conforming to the picture pattern drawn on the design manuscript 5, that is the picture pattern 102 printed on the tape cassette W. The pixel registration of the pattern is so made that the tape cassette portion corresponding to the picture pattern 102 is pixel-registered by e.g. logic level "1" and the white-ground tape cassette portion and the tape cassette portion corresponding to the index 104 are pixel-registered by e.g. logic level "0".

The non-contact printing head 8 and the container vessel 9 are responsive to output signals from the picture processor 7 so as to be moved in unison on the basis of output signals from the picture processor 7 for effectuating top coating on the tape cassette W. That is, the printing head 8 is controlled for applying the top coating on the tape cassette W so that the top coating layer 113 is formed only on the tape cassette portion pixel-registered as logic level "1" and the top coating layer 113 is not formed on the tape cassette portion pixel-registered as the logic level "0". The top coating is the operating step of forming the transparent top coating layer 113 for the purpose of improving resistance to alcohols and scratch-proofness of the full-color printed picture pattern.

Thus the portion of the transparent window 101 of the tape cassette W, processed by the above-described printing system with white solid printing, full-color printing and top coating, is free of stacked layers consisting of the highly adhesive layer 110, white-tinted ink receptive layer 111, full-color printing layer or colored layer 112 and the top coating layer 113, as shown in FIGS. 1A, 1B and 2. Although the stacked layers up to the full-color layer 112 are formed on the portion of the index 104 of the tape cassette W, the top coating layer 113 is not formed as the upper most layer.

Thus the user of the tape cassette W from the printing process is able to enter letters or other symbol marks on the portion of the index 104 of the tape cassette W with the writing instrument 114.

Figure 19:
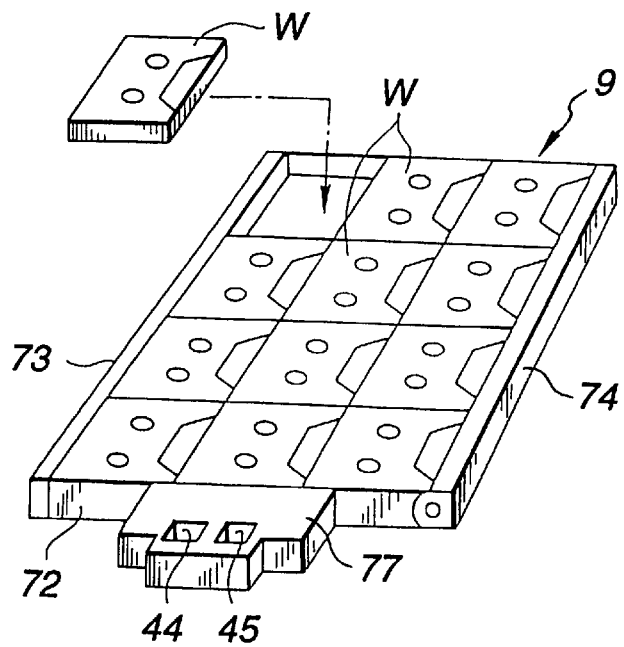
FIG. 19 is a perspective view showing a container vessel used for clamping a tape cassette.
Figure 20:
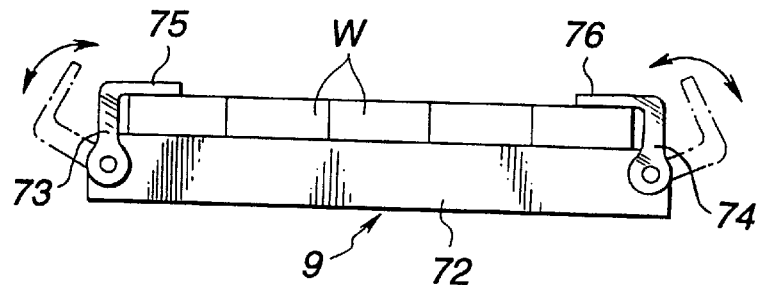
FIG. 20 is a side view showing a container vessel used for clamping tape cassetted.

The printing object supplying unit 1 is a zone in which to store a large number of dedicated printing object container vessels 9 in each of which plural tape cadettes W from the molding process are arrayed. In the present embodiment, a plurality of, herein 12, 8-mm wide video tape cadettes W, are arranged in a tray main member 72 having the size of an A-4 format copy sheet, and clamped by a pair of clamps 73, 74, as shown in FIGS. 19 and 20.

These clamps 73, 74 are rotatably arranged along the longitudinal lateral sides of the tray main member 72 and adapted for retaining the printing surface of the tape cassette W by key-shaped terminal retention members 75, 76. The clamps are perpetually biased by torsion springs, not shown, in a direction of clamping the tape cassette W in position. The tray main member 72 is formed with a transfer engaging lug 77 having the feed hook holes 44, 45 adapted for being engaged by the tray feed hooks 46, 47 of the transporting mechanism 10, respectively.

Figure 21:
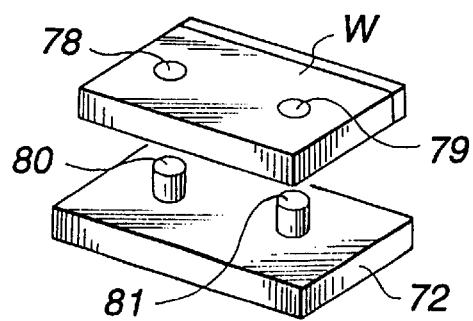
FIG. 21 is a perspective view showing an example of reliably positioning the tape cassette on the container vessel for the printing objects by providing a positioning pin on a tray main member.

For assuring positive loading of the tape cassette W on the container vessel 9 for printing objects, positioning pins 80, 81 may be set at the positions on the tray main member 72 in register with reel hub inserting openings 78, 79 formed in the tape cassette W, as shown for example in FIG. 21.

Figure 22:
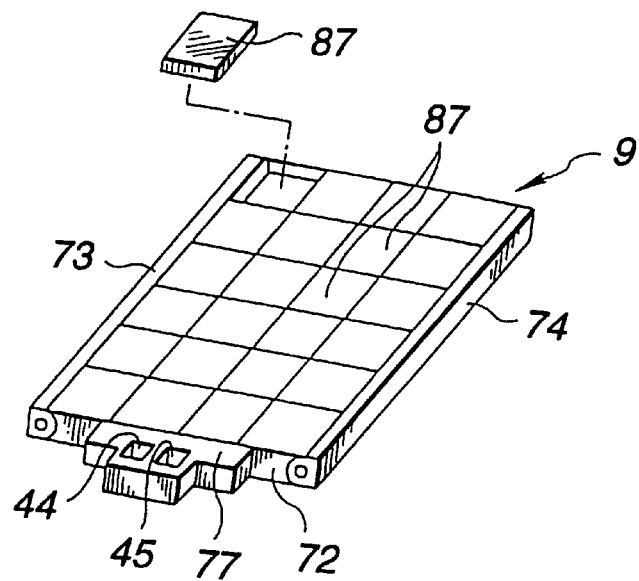
FIG. 22 is a perspective view showing a container vessel for printing objects used for clamping plastic sheets.
Figure 23:
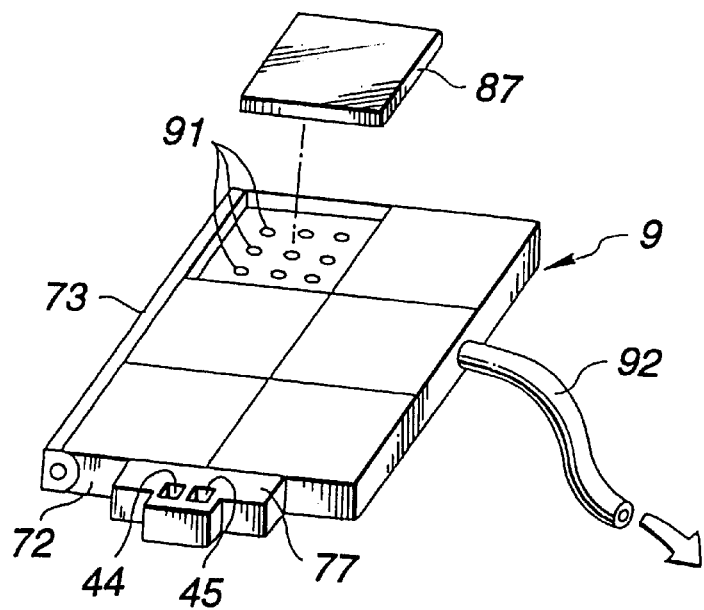
FIG. 23 is a perspective view showing a container vessel for printing objects having its tray main member formed with plural suction holes for evacuating the tray main member.
Figure 24:
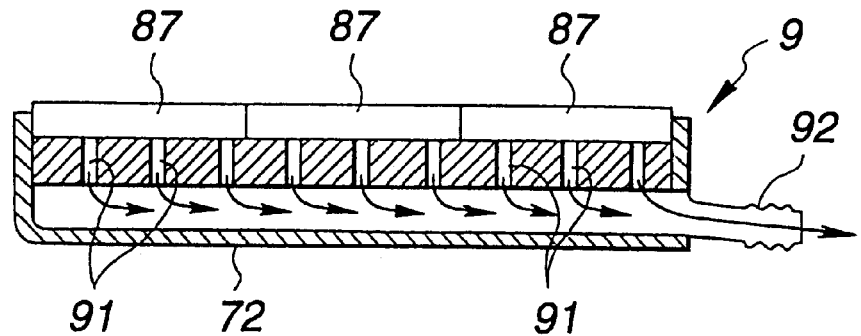
FIG. 24 is a cross-sectional view showing a container vessel for printing objects having its tray main member formed with plural suction holes for evacuating the tray main member.
Figure 25:
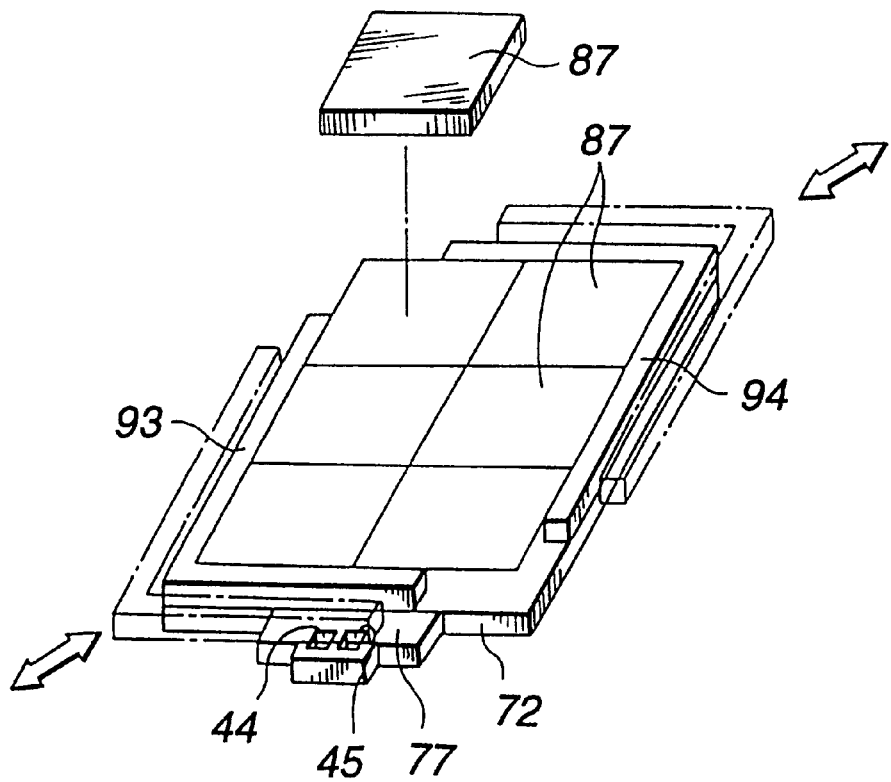
FIG. 25 is a perspective view showing a container vessel for printing objects in which movable clamps are provided at diagonal portions of the tray main member.

For full-color printing on a plastic plate 87 used for forming the container casing or the like, plural plastic plates 87 are arrayed in the container vessel 9, as shown in FIG. 22. For assuring positive loading of the plastic plates 87 on the container vessel 9, the tray main member 72 is formed with plural suction holes 91 for evacuation, and evacuation is carried out via these suction holes 91 for holding the tape cassettes W under suction effects on the tray main member 72, as shown in FIGS. 24 and 25. An evacuation hose 92 may be drawn out at a lateral surface of the tray main member 72.

For securing the plastic plates 87 to the container vessel 9, it is also possible to provide L-shaped clamps 93, 94, adapted to be moved by springs, not shown, at the diagonally opposite corner sections of the container vessel 9, for securing the plastic plates 87 by these movable clamps 93, 94, as shown in FIG. 25.

With the above-described printing system, the white solid printing, the full-color printing and the top coating are continuously performed in the following manner.

First, a plurality of tape cassettes W from the molding process are arrayed and clamped in the printing object container vessel 9 so as to be laid in store. A large number of the container vessels 9, laid in store, are handled from the supply unit 1 and transferred to the white solid printing section 2. In the white solid printing section 2, white solid printing is performed on the areas of the tape cassette W specified for printing. The white solid printing is performed in a non-contact manner on the basis of the picture or image information from the magnetic disk 13, outputted from the computer 12, so that the scanning by the printing head 8 occurs in unison with the transfer movement of the printing object container vessel 9.

After the end of the white solid printing, the container vessel 9 is transferred by the transporting mechanism 10 to the full-color printing unit 3 of the next step. In the full-color printing unit 3, full-color printing is made in the non-contact manner on the portion of the tape cassette specified for printing, based on the picture information as read by the color CCD scanner 11, with the scanning of the printing head 8 being in unison with the feed movement of the printing object container vessel 9.

After the end of the full-color printing, the printing object container vessel 9 is transferred by the transporting mechanism 10 to the top coating section 4 of the final step. In the top coating section 4, a top coating layer is formed under a non-contact state in a full color printed area of the printing object based on the picture or image information from the magnetic disk 13 outputted from the computer 12, with the scanning of the printing head 8 being in unison with the feed (transfer) movement of the container vessel 9. Finally, the printed surface is finished by the pressure roll 63 to complete the printing.

As a result, the profiled plastic plate 33 has the adhesive layer 110 and the white-tinted ink receptive layer 111 formed on the curved surface 33a, irregular surface 33b and inclined surface 33c, as shown in FIGS. 16 and 17. A full-color printed picture color layer 112 is formed thereon, and a top coating layer 113 is selectively formed thereon. The tape cassette W, shown in FIGS. 1A and 1B, has the adhesive layer 110 and the white ink receptive layer 111 formed on its outer surface, a full-color printed picture pattern layer or a colored layer 112 formed thereon, and a top coating layer 113 selectively formed thereon, as shown in FIG. 2. Above all, the top coating layer 113 is formed on the portion of the full color printed colored layer 112 excluding the index 104.

With the above-described printing system, the signals read by the image reader 6 are transformed into a pre-set picture and the information thus transformed into the picture is supplied to the non-contact printing head 8. Alternatively, the replay signals reproduced from the magnetic disk 13 having the picture information stored thereon are transformed into a picture and the information thus transformed into the picture is supplied to the non-contact printing head 8 for printing on the printing object W. As a result, printing may be made directly by the printing head 8 on the printing object W based on the output picture information.

Consequently, the pains-taking operations of master making, master plate exchange, color plate registration, ink color adjustment or ink viscosity adjustment, required in the conventional process, may be eliminated to improve the productivity as well as to reduce production costs. Since the picture output information transformed into electrical signals is produced, high-quality printing may be made from the outset for improving the yield significantly. Besides, since the printing head 8 is not contacted directly with the printing object W, printing may be made without exerting an external pressure to the printing object W irrespective of whether or not the printing object is hard or soft. Since the picture is outputted directly, color equilibrium may be automatically realized with digital duplication. Besides, the printing may be made under numerical control for simplifying the printing process.

On the other hand, with the present printing system, the non-contact printing head 8 may have its height relative to the printing object W controlled on the basis of a detection output of the detector detecting surface irregularities of the printing object W. Thus the printing may be made at all times while a pre-set distance is perpetually maintained between the printing head 8 and the printing object W to maintain the printing head at a pre-set height relative to the printing object depending on the surface irregularities of the printing object W. Thus the ink film thickness may be expressed as digital numerical values to realize high-quality printing. Besides, printing may be made continuously from the planar area up to the irregular area, inclined area, curved area, elliptical area or the polygonal area without producing color fluctuations, color fading or blurred letter edges despite the presence of warping, bending or irregularities in the printing object W.

With the container vessel 9 for the printing objects, employed for the above-described printing system, a large number of printing operations may be made simultaneously, because plural printing objects are held in position in the container vessel 9. In addition, by reading plural color patterns drawn on the design manuscript 5 by the color CCD scanner 11 and printing the color picture patterns by the contactless printing head 8, using the container vessel 9, different picture patterns may be printed on the plural printing objects W arrayed in the container vessel 9, so that small quantity multi-variety printing or simultaneous printing of different designs may be achieved highly efficiently.

What is claimed is:

1. A method for printing on a container casing for recording media having a main casing member having the recording media housed therein, comprising the steps of:

forming an underlying layer on an outer surface of said main casing member by printing, forming a colored layer by printing on the said underlying layer, and selectively forming a protective layer on the surface of said colored layer by printing, excluding a portion thereof to define an area of said colored layer which is unprotected and on which writing can be performed.

2. A method for printing on a container casing for recording media having a main casing member having the recording media housed therein, comprising the steps of:

reading a picture information used for printing on said main casing member, forming an underlying layer on an outer surface of said main casing member by printing, forming a colored layer on said underlying layer by printing, based on the read picture information, and forming a protective layer on the entire surface of said colored layer based on the read picture information excluding a selected portion such that an opening is formed in said portion of said colored layer on which writing can be formed.

* * * * *